(No Model.)

J. R. DAVIS.
WHIFFLETREE HOOK.

No. 445,804. Patented Feb. 3, 1891.

Witnesses
Geo. W. Young
N. E. Oliphant

Inventor
John R. Davis
By Stout & Underwood
Attorneys

UNITED STATES PATENT OFFICE.

JOHN R. DAVIS, OF RACINE, WISCONSIN.

WHIFFLETREE-HOOK.

SPECIFICATION forming part of Letters Patent No. 445,804, dated February 3, 1891.

Application filed September 4, 1889. Serial No. 322,967. (No model.)

*To all whom it may concern:*

Be it known that I, JOHN R. DAVIS, of Racine, in the county of Racine, and in the State of Wisconsin, have invented certain new and useful Improvements in Whiffletree-Hooks; and I do hereby declare that the following is a full, clear, and exact description thereof.

My invention relates to whiffletree-hooks; and it consists in certain peculiarities of construction, as will be fully set forth hereinafter, and subsequently claimed.

Figure 1:
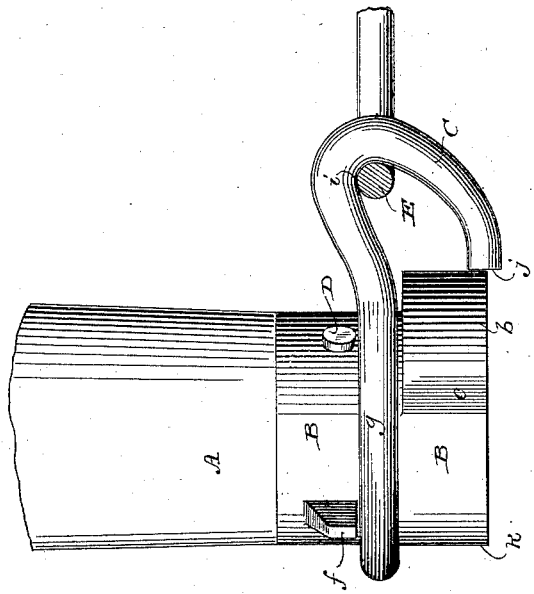
Figure 2:
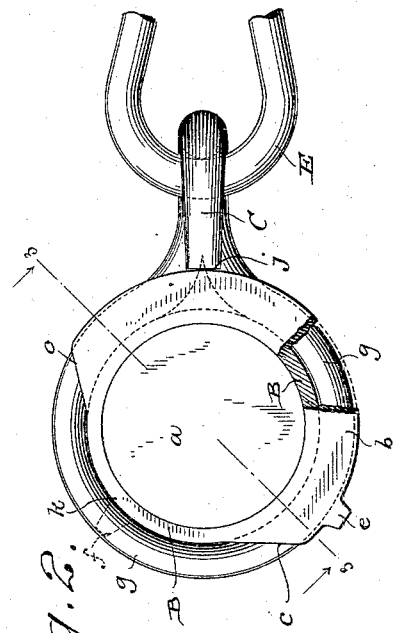
Figure 3:
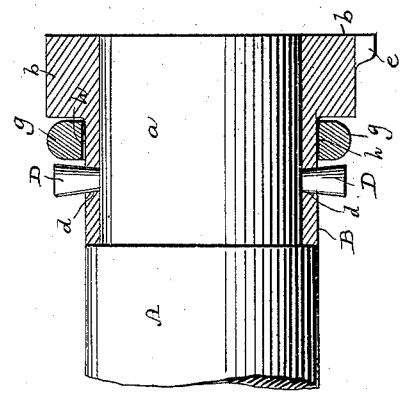

In the drawings, Figure 1 is a plan view of my improved device in the closed position ready for use, with the cockeye of a trace shown, partly in section, in operative position. Fig. 2 is an end view, partly broken away, of said parts; and Fig. 3 is a secton on the line 3 3 of Fig. 2.

My present device is, in part, an improvement on that shown in my patent, No. 397,112, granted to me February 5, 1889, and, like that device, consists of a ferrule and ring to be applied to the end of a whiffletree; but, unlike my said former device, the outer end of my present ferrule is preferably everywhere flush with the end of the whiffletree A, the latter having, as before, preferably a reduced end $a$, on which the ferrule B is fitted, and dispensing entirely with the notched or cut-away portions of my former whiffletree and ferrule. The outer end of my present ferrule is re-enforced by a shoulder or flange $b$, extending somewhat more than half around the circumference thereof, and whose end edges preferably incline gradually to the outer surface of the ferrule, as shown best at $c\ c$ in Fig. 2, and the said flange $b$, near one end, is preferably provided with a stop or lug $e$. The ferrule is further preferably formed with holes $d\ d$ to admit the passage therethrough of tapered malleable-iron pins D D, to be driven into the wood of the whiffletree after the hook-ring $g$ is in place, as shown and described in my said patent hereinbefore referred to, the said ferrule having a lug $f$ below and bearing against said hook-ring $g$, also as shown in said prior patent. The hook-ring $g$ is made in one piece (as by welding) with its hook C, and the inner bearing-surface of said ring is preferably flat, as best shown at $h$, Fig. 3, whereby the said hook-ring is prevented from accidentally dropping out of position, and the hook proper has an inward bend or offset, as shown at $i$, Fig. 1, so that the cockeye E will be practically in the line of draft with the ring $g$, as best shown in Fig. 1. The end of the hook C is flat, as shown at $j$, Figs. 1 and 2, so as to bear against the shoulder or flange $b$ of the ferrule B, said hook end projecting somewhat beyond the outer edge or end of the said shoulder or flange.

The operation of my device will be apparent from the foregoing description of its construction. In order to insert the cockeye E, the hook C is turned around until it is exactly in the reverse position from that shown in Fig. 1, and then the cockeye is readily inserted, by reason of the space between the end $j$ of said hook C and the end of the ferrule, at the point marked $k$, which is intermediate between the ends $c\ c$ of the shoulder or flange $b$ on said ferrule. When the cockeye E is in place, the hook is turned around to the position shown in Figs. 1 and 2, and thereby the cockeye is securely locked against accidental displacement. In the event of the trace becoming slack, as by the sudden stopping of the team, and the consequent falling of the hook C and cockeye, the stop or lug $e$ will engage the end of said hook and prevent the latter from slipping beyond the end of the shoulder or flange $b$. This shoulder may either be solid, as shown, or, if preferred, (so as to save metal,) merely a bearing-shell, but in either case would be integral with the ferrule $b$. The flat surface $h$ on the inside of the hook-ring $g$ affords a better bearing-surface for the hook-ring than would be had with a ring round in cross-section, as commonly used, and by having the offset or bend $i$ in the hook C, so that the cockeye and hook-ring are in line with each other, as described, the whole force of the pull is squarely and evenly exerted against the whiffletree. The hook and its ring may be of either wrought or malleable iron, as preferred.

Having thus described my invention, what I claim as new, and desire to secure by Letters Patent, is—

The combination, with a whiffletree end, of a ferrule fitted thereto having holes in its opposing sides and a lug intermediate of said holes, a continuous flat outer end flush with the whiffletree end, and a shoulder or flange integral with said ferrule, flush with its outer end, and partially surrounding the same, a lug projecting from said shoulder or flange near one end thereof, a ring surrounding said ferrule and bearing against the inner edge of said shoulder or flange and against the said intermediate lug, malleable-iron pins driven through said holes into the said whiffletree end, and a hook integral with said ring having an offset of a size to receive and retain a cockeye, and an inturned end formed flat for engagement with the said shoulder or flange, substantially as set forth.

In testimony that I claim the foregoing I have hereunto set my hand, at Racine, in the county of Racine and State of Wisconsin, in the presence of two witnesses.

JOHN R. DAVIS.

Witnesses:
A. CARY JUDD,
NETTIE FALBE.